United States Patent
Oda

(10) Patent No.: US 7,319,205 B2
(45) Date of Patent: Jan. 15, 2008

(54) LASER WELDING METHOD AND DEVICE

(75) Inventor: Koji Oda, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/461,029

(22) Filed: Jul. 31, 2006

(65) Prior Publication Data

US 2007/0029293 A1    Feb. 8, 2007

(30) Foreign Application Priority Data

Aug. 5, 2005    (JP)    ............... 2005-228346

(51) Int. Cl.
*B23K 26/20*    (2006.01)
(52) U.S. Cl. .............. 219/121.63; 219/121.64
(58) Field of Classification Search ........... 219/121.63, 219/121.64
See application file for complete search history.

(56) References Cited

U.S. PATENT DOCUMENTS

| | | | |
|---|---|---|---|
| 4,682,002 A * | 7/1987 | Delle Piane et al. .... | 219/121.64 |
| 5,216,220 A | 6/1993 | Davis et al. | |
| 6,797,915 B2 * | 9/2004 | Jack ...................... | 219/121.64 |
| 7,150,391 B2 * | 12/2006 | Fujimoto et al. ...... | 219/121.64 |
| 2004/0118818 A1 | 6/2004 | Oda et al. | |
| 2007/0007254 A1 * | 1/2007 | Wang et al. ........... | 219/121.64 |

FOREIGN PATENT DOCUMENTS

| | | | |
|---|---|---|---|
| DE | 20220949 | | 7/2004 |
| EP | 1454702 | | 9/2004 |
| EP | 1316383 | | 4/2005 |
| FR | 2822400 | | 9/2002 |
| GB | 2389552 | | 12/2003 |
| JP | 60-154894 A | * | 8/1985 |
| JP | 7-266069 A | * | 10/1995 |
| JP | 2001-162387 A | * | 6/2001 |
| JP | 2002-18582 A | * | 1/2002 |
| JP | 2002-35970 A | * | 2/2002 |
| JP | 2002-103069 A | * | 4/2002 |
| JP | 2002-263871 | | 9/2002 |
| JP | 2003-025082 | | 1/2003 |
| JP | 2006-110565 A | * | 4/2006 |
| JP | 2006-116573 A | * | 5/2006 |

* cited by examiner

*Primary Examiner*—Geoffrey S. Evans
(74) *Attorney, Agent, or Firm*—Rankin, Hill, Porter & Clark LLP

(57) ABSTRACT

Electrodes 2, 3 are contact with an uppermost work W1 and energized with electricity so as to thermally expand an electrode contact portion of the work W1 or alternatively so as to thermally expand the electrode contact portion of the work W1 and a heat transfer portion of an adjoining work W2 to which heat is transferred from the electrode contact portion, and then the portions are contracted so as to form a deformed portion Q and the deformed portion Q is separated from the adjoining works W1, W2 and a gap H is formed between the works W1, W2 which are overlapped, and a laser beam L is irradiated at a position where the gap H is large enough to spread the vapor generated by the vaporization of the coating heated.

8 Claims, 7 Drawing Sheets

LASER WELDING METHOD AND DEVICE

This application claims foreign priority from Japanese Patent Application No. 2005-228346, filed Aug. 5, 2005, the entire contents of which are hereby incorporated by reference.

BACKGROUND OF THE INVENTION

1. Field of the Invention

The present invention relates to a laser welding method of welding a plurality of flat works, which are overlapped with each other, having coating on the surfaces with a laser beam. The present invention also relates to a laser welding device to which the laser welding method is applied.

2. Related Art

In general, in the case where flat works such as galvanized steel sheets, on the surfaces of which coating is provided, are overlapped with each other and welded by a laser beam, since a boiling point of zinc provided on the steel sheet surfaces is lower than a melting point of the sheet material, zinc is vaporized during the process of welding and zinc vapor is generated and the thus generated zinc vapor remains in the welding portion and further the thus generated zinc vapor blows out the melted steel sheet material, which could be a cause of a defect of welding such as blowholes or pits. In order to prevent the occurrence of the above problems, it is necessary to properly discharge the vapor of the zinc coating from the steel sheet surface to the outside.

Therefore, the following methods are conventionally known. Disclosed in JP-A-2002-263871 is a method in which one of the works is irradiated and heated with a laser beam so that the works can be separated from each other, and another laser beam is irradiated to the separated portion. However, this laser welding method, in which two lasers are used, is disadvantageous in that the manufacturing cost is raised because one of the two lasers is used as a heat source for heating the work. In order to solve this problem, disclosed in JP-A-2003-025082 is a method, as shown in FIG. 7 of the present description, in which galvanized steel sheets 101, 102 are overlapped and welded by a laser beam. A portion, in which the galvanized steel sheets 101, 102 are overlapped, is preheated by a plasma heat source 107, and then the primary laser beam welding is conducted by a laser beam 108.

According to this laser welding method, a portion of the upper side of the upper side galvanized steel sheet 101 is melted by a plasma heat source 107 for preheating which precedes in the welding direction 121, and heat is transferred to a region, which is not melted yet, located in a remaining region in which the steel sheets are overlapped. In this way, zinc plating 104, 105 provided on the face, on which the steel sheets are overlapped, is heated and vaporized. At this time, the upper side galvanized steel sheet 101 is deformed by the heat generated by the plasma heat source 107. Accordingly, a gap is formed between the galvanized steel sheets 101, 102. Next, at a position distant from the heating position of the plasma heat source 107 by a predetermined distance L, the upper side galvanized steel sheet 101 and the lower side galvanized steel sheet 102 are heated with a laser beam 108 for welding. Due to the foregoing, while galvanizing vapor is being discharged from the gap, the galvanized steel sheets 101, 102 are welded being penetrated.

However, in this laser welding method, since the plasma heat source 107 is used, in order to form a gap between the galvanized steel sheets 101, 102 and in order to heat and vaporize the zinc plating 104, 105 on the surface, on which the galvanized steel sheets 101, 102 are overlapped, it is necessary that an upper face of the upper side galvanized steel sheet 101 is widely melted exceeding the irradiation beam width of the laser beam 108. Therefore, the corrosion prevention property and the appearance of the surface of the galvanized steel sheet 101 are deteriorated, that is, the surface property of the steel sheet is damaged. Further, since the plasma heat source 107 is used, in order to stabilize a heat input, it is necessary to increase an output. Therefore, an excessively large quantity of heat is given to the galvanized steel sheet 101. Accordingly, a heat deformation of the galvanized steel sheet 101 is increased.

The present invention has been accomplished to solve the above problems. An object of the present invention is to provide a laser welding method capable of easily adjusting a quantity of heat to be inputted and also capable of substantially eliminating a heat deformation of a work and a damage caused on a work surface. Another object of the present invention is to provide a laser welding device to which the laser welding method is applied.

SUMMARY OF THE INVENTION

In accordance with one or more embodiments of the present invention, in a laser welding method for welding a plurality of overlapped flat works having coating, an electrode is contact with an uppermost work and energized with electricity so as to thermally expand an electrode contact portion of the work or alternatively so as to thermally expand the electrode contact portion of the work and a heat transfer portion of an adjoining work to which heat is transferred from the electrode contact portion, and then the portions are contracted so as to form a deformed portion and the deformed portion is separated from the adjoining work and a gap is formed between the works which are overlapped, and a laser beam is irradiated at a position where the gap is large enough to spread the vapor generated by the vaporization of the coating heated.

In the laser welding method, when electricity is supplied to the uppermost work in the works, via the electrode, the electrode contact portion of the work or the electrode contact portion and the heat transfer portion are thermally expanded and then contracted. Due to the foregoing, a deformed portion is formed. This deformed portion is separated from the adjoining work so as to form a gap between the works. At a position where an interval of the gap is large enough to spread the vapor generated by the vaporization of the coating heated, a laser beam is irradiated. The vapor, which is generated when the coating is heated, can be spread through the gap. Therefore, the works can be welded to each other without causing any defect. Consequently, according the laser welding method of the present invention, the gap may be formed by the heating conducted when the electrode is energized with electricity, that is, it is unnecessary to melt the coating on the work surface. Since an excessively large quantity of heat is not given, the work surface is not damaged and the heat deformation can be substantially avoided.

In addition, in the laser welding method, since the electrode is contact with the work surface, even when the welding speed is raised, welding can be positively executed. That is, only when an electric current is properly set, a quantity of heat for welding can be easily controlled. Therefore, when an electric current is controlled corresponding to the welding speed, the gap can be positively formed and laser welding can be stably executed.

Moreover, in the laser welding method, the aforementioned electrode may include: one contact electrode coming into contact with a work surface; and an earth stationary electrode which is connected to the earth. The aforementioned electrode may be a pair of electrodes, and one of the electrodes maybe contact with the uppermost work and the other electrode may come into pressure-contact with the work concerned, so that both electrodes can be energized with electricity to each other. In the case where the aforementioned electrode includes a pair of electrodes, one of the electrodes may come into pressure-contact with the adjoining work. Alternatively, one of the electrodes may be contact with the adjoining work.

Further, in accordance with one or more embodiments of the present invention, a laser welding device of welding a plurality of overlapped flat works having coating on the surfaces is provided with: a pair of electrodes for energizing an uppermost work with electricity so as to thermally expand an electrode contact portion of the work or alternatively so as to thermally expand an electrode contact portion of the work and a heat transfer portion of an adjoining work to which heat is transferred from the electrode contact portion, and then the portions are contracted so as to form a deformed portion and the deformed portion is separated from the adjoining work and a gap is formed between the works which are overlapped, and a laser head for conducting welding by irradiating a laser beam at a position where the gap is large enough to spread the vapor generated by the vaporization of the coating heated, wherein the pair of electrodes include a stationary electrode arranged at a position distant from the laser head by a predetermined distance so that the stationary electrode can come into pressure-contact with the uppermost work and also include a movable electrode arranged at a position distant from the laser head by a predetermined distance so that the movable electrode can freely come into contact with the uppermost work.

According to the laser welding device, a forward end portion of one electrode only comes into contact with the uppermost work. Therefore, the electrode is movable with respect to the laser head. Accordingly, in the case where a surface shape of the work fluctuates, the electrode can be positively contact with the work while following the fluctuation of the surface shape and the gap can be formed. Since the other electrode comes into pressure-contact with the uppermost work, in the case where the works are separated from each other by the fluctuation of the surface shape, it is possible to correct the fluctuation and the works can be tightly contact with each other.

Other aspects and advantages of the invention will be apparent from the following description and the appended claims.

DETAILED DESCRIPTION OF THE EXEMPLARY EMBODIMENTS

Exemplary embodiments of the invention will be described with reference to the accompanying drawings.

Figure 1:
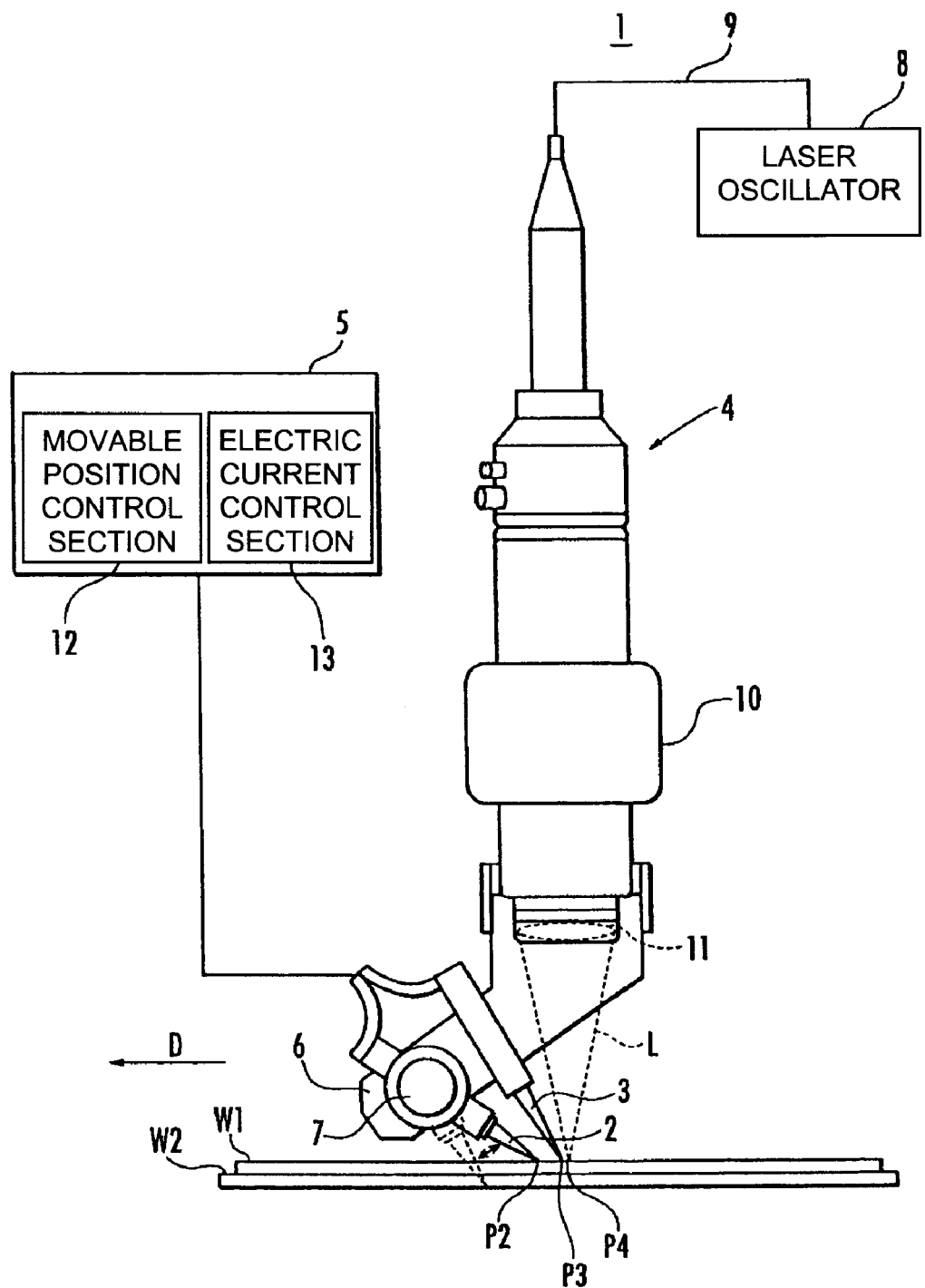
FIG. 1 is a schematic illustration for explaining a laser welding device to execute the laser welding method of the present exemplary embodiment.
Figure 2:
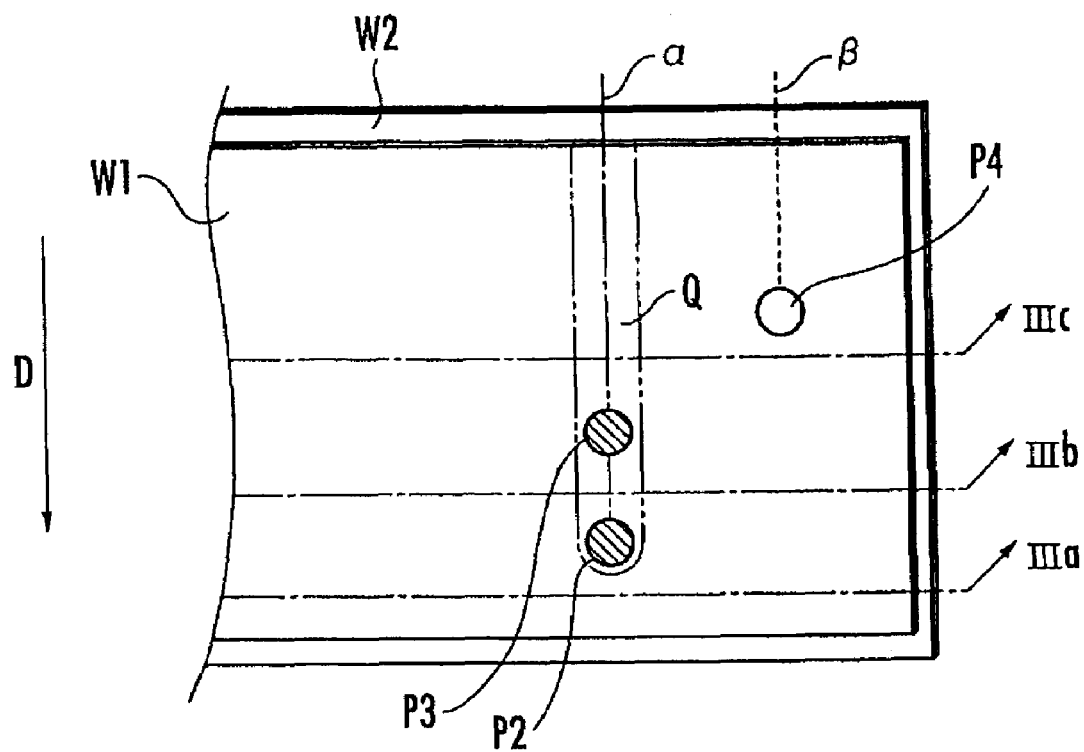
FIG. 2 is a schematic illustration showing a positional relation on a steel sheet W1 of the present exemplary embodiment.
Figure 3A:
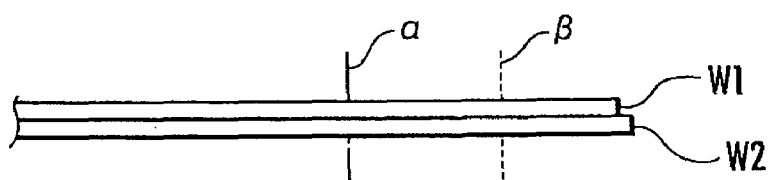
FIGS. 3(a) to 3(c) are sectional views of the steel sheets W1 and W2 shown in FIG. 2.
Figure 3B:
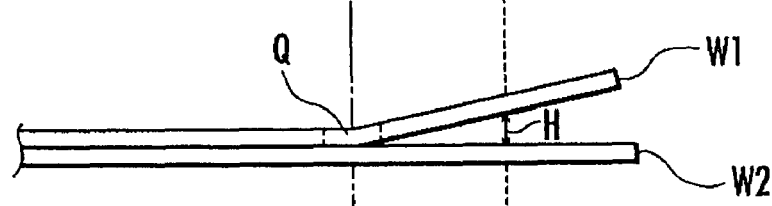
Figure 3C:
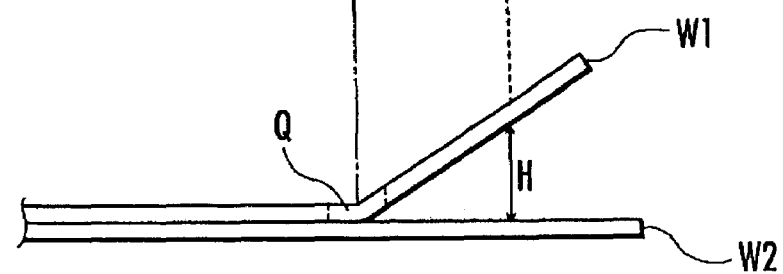
Figure 4:
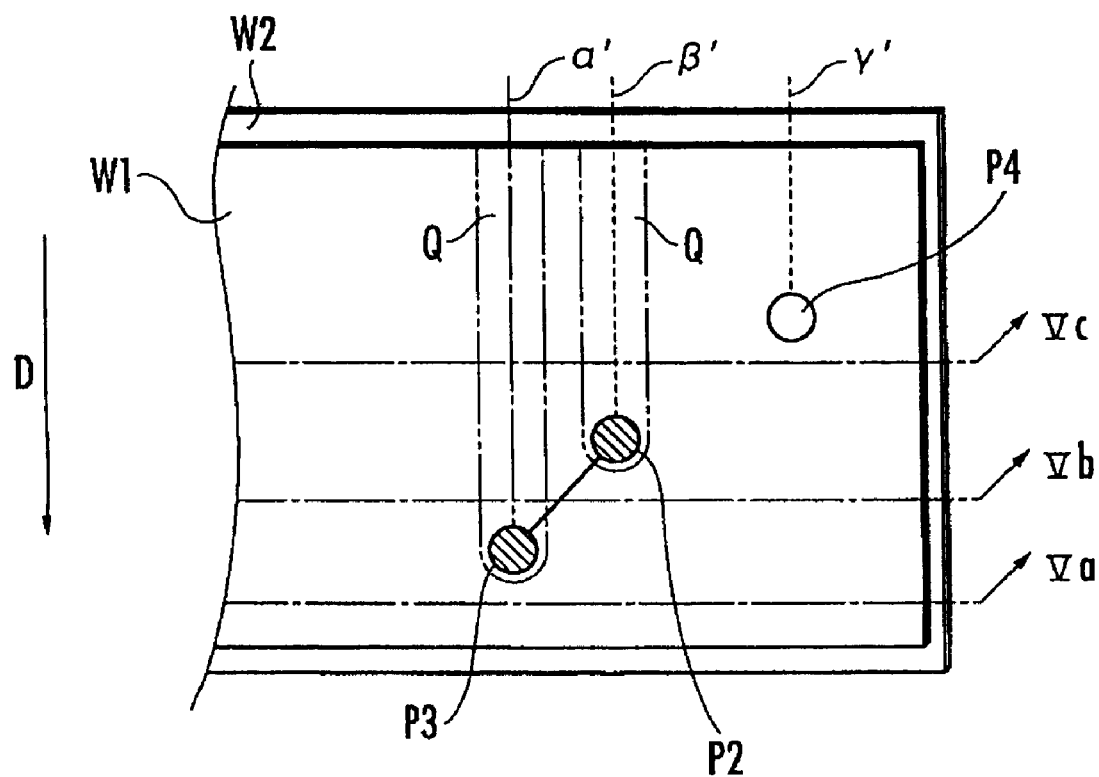
FIG. 4 is a schematic illustration showing a positional relation on the steel sheet W1 in another exemplary embodiment of the present invention.
Figure 5A:
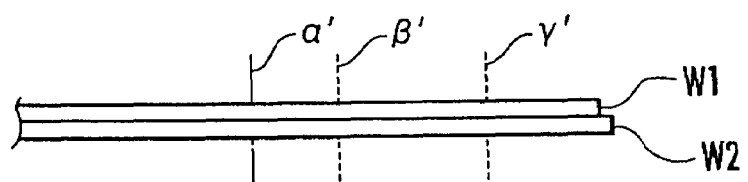
FIGS. 5(a) to 5(c) are sectional views of the steel sheets W1 and W2 shown in FIG. 4.
Figure 5B:
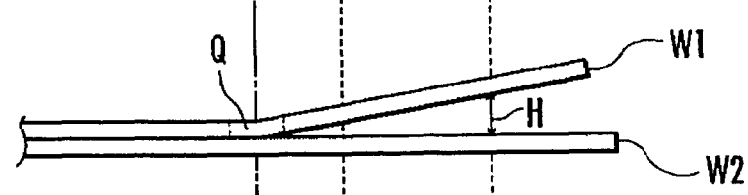
Figure 5C:
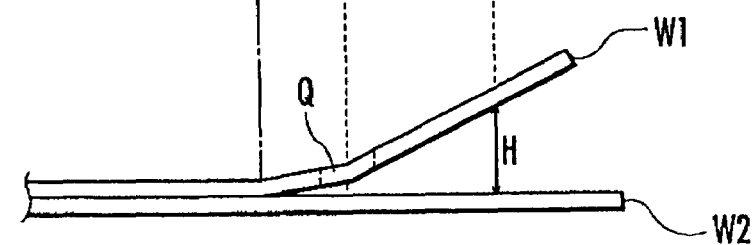
Figure 6:
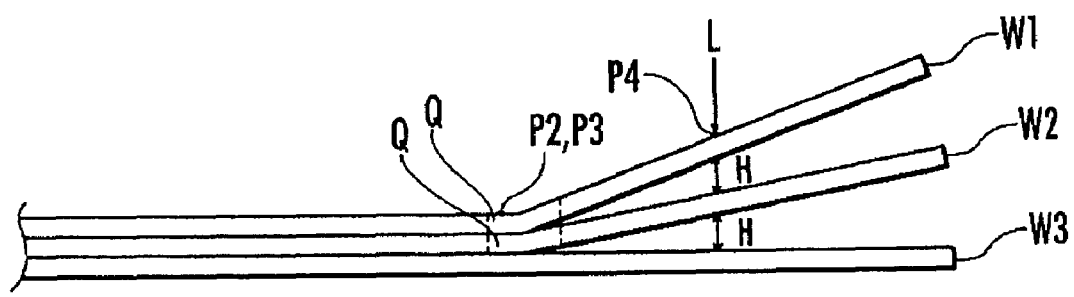
FIG. 6 is a schematic illustration showing of still another exemplary embodiment of the present invention.
Figure 7:
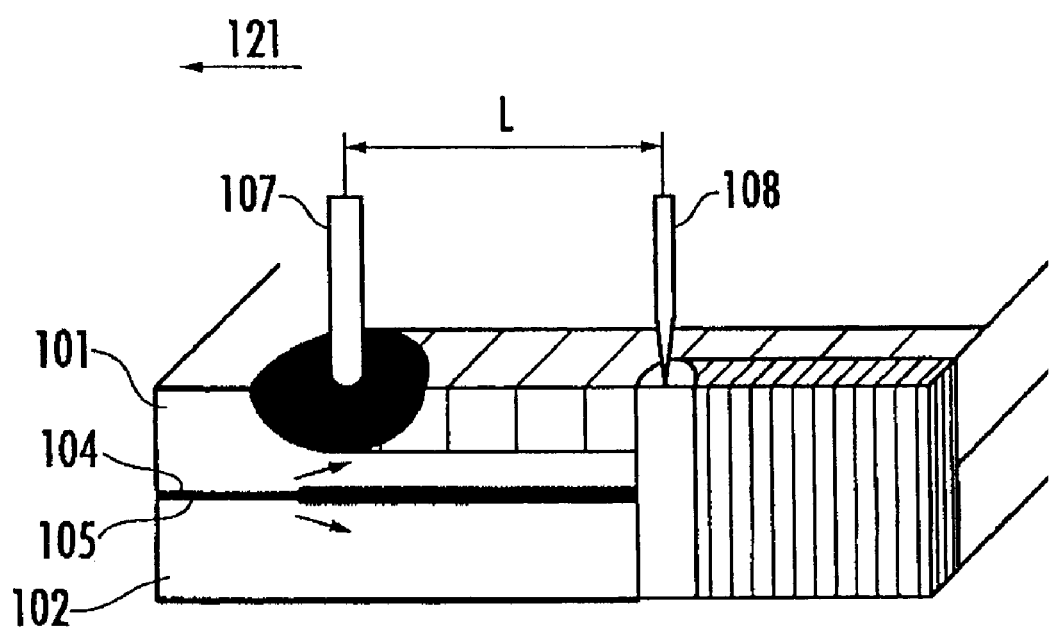
FIG. 7 is a schematic illustration showing a laser welding device for executing a conventional laser welding method.

FIG. 1 is a schematic illustration for explaining a laser welding device to execute the laser welding method of a exemplary embodiment. FIG. 2 is a schematic illustration showing a positional relation on a steel sheet W1 of the present exemplary embodiment. FIGS. 3(a) to 3(c) are sectional views of the steel sheets W1 and W2 shown in FIG. 2. FIG. 4 is a schematic illustration showing a positional relation on the steel sheet W1 in another exemplary embodiment of the present invention. FIGS. 5(a) to 5(c) are sectional views of the steel sheets W1 and W2 shown in FIG. 4. FIG. 6 is a schematic illustration showing of still another exemplary embodiment of the present invention.

As shown in FIG. 1, the laser welding method of the present exemplary embodiment is a method of welding the galvanized steel sheets W1 and W2. The laser welding device 1 for executing the welding method is provided with: a movable electrode 2 coming into contact with the steel sheet W1; a stationary electrode 3 coming into pressure-contact with the steel sheet W1; a laser beam irradiation mechanism 4 for irradiating a laser beam L to a position P4 on the steel sheet W1 which is distant from a pressure-contact position P3 of the stationary electrode 3 by a predetermined distance so as to weld the steel sheets W1 and W2 to each other; and a control means 5 for controlling a relative positional relation between the movable electrode 2 and the stationary electrode 3 and for controlling an electric current impressed upon the electrode.

The movable electrode 2 is connected to the control means 5 and pivotally arranged via a rotary mechanism 7 at a position on an arm 6, which is integrated with a laser head 10, being inclined by a predetermined angle in a welding direction D with respect to the vertical direction. The rotary mechanism 7 is connected to the control means 5 and rotates the movable electrode 2 by a motor not shown and by a drive mechanism in accordance with a control signal sent from the control means 5. On the other hand, the stationary electrode 3 is connected to the control means 5 and fixed at a position on the arm 6 being inclined by a predetermined angle in the welding direction D with respect to the vertical direction so that a pressure-contact position P3 and an irradiating position P4 of the laser beam L can be maintained by a predetermined interval. The movable electrode 2 and the stationary electrode 3, which are integrated with the laser head 10 via the arm 6, are provided so that they can be moved in the welding direction D by a motor and a feeding mechanism not shown in the drawing. In this case, since the movable electrode 2 and the stationary electrode 3 are provided being inclined by a predetermined angle in the welding direction D with respect to the vertical direction, when the movable electrode 2 and the stationary electrode 3 are moved coming into contact with or coming into pressure-contact with the steel sheet W1, friction caused between the electrode and the steel sheet W1 can be reduced.

The laser irradiation mechanism 4 includes: a laser oscillator 8 arranged outside; an optical fiber 9; a laser head 10; and a condenser lens 11. The laser oscillator 8 and the laser head 10 are connected to each other via the optical fiber 9.

A laser beam L emitted from the laser oscillator 8 is sent to the laser head 10 via the optical fiber 9 and irradiated from the laser head 10 onto the steel sheet W1 by the condenser lens 11 so that the laser beam L can be condensed to a desired diameter.

The control means 5 includes: a movable position control section 12; and an electric current control section 13. The movable position control section 12 is connected to the rotary mechanism 7 and directs a rotation of the movable electrode 2 on the arm 6. The electric current control section 13 is connected to the movable electrode 2 and the stationary electrode 3.

Next, operation of the laser welding device 1 composed as described above will be explained as follows. First, the galvanized flat steel sheets W1 and W2 are positioned being overlapped as shown in FIG. 1. In this connection, the steel sheets W1 and W2, which are overlapped, are mostly closely contact with each other. However, some portions of the steel sheets W1 and W2 are separate from each other due to the fluctuation of the surface shape of the steel sheet.

In the laser welding device 1, the movable electrode 2 and the stationary electrode 3 are arranged on a straight line, which is parallel with the welding direction D, in such a manner that the movable electrode 2 precedes the stationary electrode 3. The laser head 10 is arranged at a position, which is separate from the straight line connecting the movable electrode 2 with the stationary electrode 3 by a predetermined distance, at the rear of the stationary electrode 3. Further, a vertical position of the laser head 10 is fixed with respect to the stationary electrode 3 so that a diameter of the laser beam L irradiated from the laser head 10 onto the steel sheet W1 can be condensed to a predetermined diameter when the stationary electrode 3 comes into pressure-contact with the steel sheet W1 at the pressure-contact position P3.

Referring to FIG. 2, a positional relation provided on the steel sheet W1 at this time will be specifically explained below. First, the contact position P2, at which the movable electrode 2 comes into contact with the steel sheet W1, and the pressure-contact position P3, at which the stationary electrode 3 comes into pressure-contact with the steel sheet W1, are arranged so that an electrode line $\alpha$ connecting the contact position P2 with the pressure-contact position P3 can be a straight line parallel with the welding direction D. On the other hand, the irradiation position P4, which is a position at which the laser beam L is irradiated on the steel sheet W1, is arranged so that a welding line $\beta$, which is an orbit of the irradiating position P4, can be parallel with the welding direction D and can be a straight line distant from the electrode line $\alpha$ by a predetermined interval.

In the above state, the movable position control section 12 of the control means 5 emits a command signal of rotation to the rotary mechanism 7, and the rotary mechanism 7 impresses a weak contact electromotive force upon a motor not shown, so that a forward end portion of the movable electrode 2 can be rotated in a direction of the steel sheet W1. The contact electro-motive force is impressed upon the motor during the welding operation. Therefore, the forward end portion of the movable electrode 2 can be maintained in a state of contact with the steel sheet W1 in which the forward end portion of the movable electrode 2 is contact with the steel sheet W1 by a weak force which is sufficient to follow the shape of the steel sheet W1 to generate heat stably.

When the movable electrode 2 comes into contact with the steel sheet W1, according to the interval between the movable electrode 2 and the stationary electrode 3 and also according to the material and wall thickness of the steel sheet W1, the electric current control section 13 calculates an electric current, by which the gap H on the welding line $\beta$ is maintained at a predetermined interval, and impresses the electric current upon between the movable electrode 2 and the stationary electrode 3. It is preferable that the predetermined interval of the gap H is set in a range from 0.05 to 0.5 mm which is necessary for a metallic component (zinc) of the coating formed on the surfaces of the steel sheets W1 and W2 to be vaporized and discharged from the gap H into the atmosphere. An electric current given to the movable electrode 2 and the stationary electrode 3 for accomplishing the above object is, for example, about 50 to 1000 ampere.

When an electric current is impressed upon between the movable electrode 2 and the stationary electrode 3, first, the contact portion P2 of the steel sheet W1 with the movable electrode 2 and the pressure-contact portion P3 of the steel sheet W1 with the stationary electrode 3 are heated and thermally expanded. At this time, the movable electrode 2 and the stationary electrode 3, which are arranged being integrated with each other into one body via the laser head 10 and the arm 6, proceed in the welding direction D by a motor and a feeding mechanism not shown. Therefore, the steel sheet W1 is thermally expanded in the traverse direction with respect to the electrode line $\alpha$. Therefore, a deformed portion Q having a predetermined width is formed. Next, the thus heated steel sheet W1 is cooled from the surface coming into contact with the atmospheric air and contracted. As a result, a portion of the deformed portion Q of the steel sheet W1, that is, a portion on the end side of the steel sheets W1 and W2 is plastically deformed with respect to the electrode line $\alpha$ and warped upward. Accordingly, a predetermined gap H shown in FIG. 3 is formed between the steel sheets W1 and W2. That is, as shown in FIG. 3(*b*), when the movable electrode 2 passes through, the first warp is caused on the electrode line $\alpha$ with respect to the state shown in FIG. 3(*a*). As shown in FIG. 3(*c*), when the stationary electrode 3 passes through, the second warp is caused on the electrode line $\alpha$ in addition to the first warp. In this case, the movable electrode 2, which is preceding the stationary electrode 3, comes into contact with the steel sheet W1 by a predetermined contact force as described before. Therefore, even when the surface shape of the steel sheet W1 fluctuates, the movable electrode 2 can follow the surface shape and positively come into contact with the steel sheet W1. On the other hand, the stationary electrode 3 makes the steel sheet W1 come into pressure-contact with steel sheet W2 at a position where the movable electrode 2 passes through. Therefore, a separation of the steel sheet W1 from the steel sheet W2, which is caused by the fluctuation of the surface shapes of the steel sheets W1 and W2, can be corrected and the steel sheets W1 and W2 can be closely contact with each other. When the steel sheets W1 and W2 are closely contact with each other at the pressure-contact portion P3 by making the stationary electrode 3 come into pressure-contact with the steel sheet W1 and further an intensity of the electric current is adjusted, the warp caused at the contact position P2 and the pressure-contact portion P3 can be controlled. In this way, the gap H at the irradiating position P4 can be controlled.

Simultaneously when an electric current is impressed upon between the movable electrode 2 and the stationary electrode 3, the movable electrode 2 and the stationary electrode 3, which are arranged in the laser head 10 being integrated with each other via the arm 6, proceed in the welding direction D at a predetermined speed.

Due to the foregoing, in the laser beam irradiation mechanism 4, the laser oscillator 8 is driven, and the laser beam L emitted from the laser oscillator 8 is sent to the laser head 10. Then, the laser beam L is irradiated to the irradiation position P4 on the uppermost steel sheet W1 via the condenser lens 11, and the steel sheets W1 and W2 can be welded to each other.

At this time, the coating on the surface, on which the steel sheets W1 and W2 are put with each other, is heated and the metallic component (zinc) contained in the coating is vaporized. However, zinc vapor, which has been vaporized in this way, is discharged from the gap H into the atmospheric air. Due to the foregoing, the steel sheets W1 and W2 can be positively and strongly welded to each other. When an intensity of the electric current is adjusted so that a heat input at the contact position P2 and the pressure-contact position P3 can be set at a value by which the gap can be sufficiently formed and the surface of the steel sheet W1 can not be melted, the surface of the steel sheet W1 can not be substantially damaged.

In this connection, in the present exemplary embodiment, instead of the movable electrode 2, an earth electrode, which is connected to the steel sheet W1 or the adjoining steel sheet W2, may be provided and only the stationary electrode 3 may come into pressure-contact with the steel sheet W1. In this case, only the stationary electrode 3 passes on the steel sheet W1. Therefore, the structure of the device can be simplified. Alternatively, the following structure may be adopted. One of the movable electrode 2 and the stationary electrode 3 is contact to the other steel sheet W2 or is contact to the other steel sheet W2 with pressure in the reverse direction to the direction of contacting with the steel sheets W1. In this case, after the steel sheets W1 and W2 have been heated and thermally expanded at the contact position or the pressure-contact position of the electrode with the steel sheet, the heated portion is cooled from the surfaces of the steel sheets W1 and W2 and contracted. Therefore, the steel sheets W1 and W2 are plastically deformed in such a manner that end portions of the steel sheets W1 and W2 are separated from each other in the opposite direction. Therefore, an intensity of the electric current impressed upon between the movable electrode 2 and the stationary electrode 3 can be reduced.

Another exemplary embodiment may be provided as follows. A positional relation among the contact position P2 of the movable electrode 2 on the steel sheet W1, the pressure-contact position P3 of the stationary electrode 3 and the irradiating position P4 of the laser beam may be set as shown in FIG. 4. That is, the stationary electrode line $\alpha'$, which is an orbit of the preceding pressure-contact position P3, is a straight line parallel with the welding direction D, the movable electrode line $\beta'$, which is an orbit of the succeeding contact position P2, is a straight line parallel with the welding direction D and distant from the stationary electrode line $\alpha'$ by a predetermined interval, and the welding line $\gamma'$, which is an orbit of the final irradiating position P4, is a straight line parallel with the welding direction D and distant from the movable electrode line $\beta'$ by a predetermined interval.

In this case, with respect to FIG. 5(*a*) which shows a state before the stationary electrode 3 passes, as shown in FIG. 5(*b*), when the stationary electrode 3 passes, the first warp is caused on the stationary electrode line $\alpha'$. In this connection, at this time, since the stationary electrode 3 comes into pressure-contact with the steel sheet W1, the steel sheets W1 and W2 are closely contact with each other at the pressure-contact position P3. As shown in FIG. 5(*c*), when the movable electrode 2 passes through, the second warp is caused on the movable electrode line $\beta'$. Therefore, as compared with the aforementioned case in which both the movable electrode 2 and the stationary electrode 3 are arranged on the straight line $\alpha$ parallel with the welding direction, a heat input on the stationary electrode line $\alpha'$ and the movable electrode line $\beta'$ can be reduced. Accordingly, damage caused on the steel sheet W1 can be further reduced.

Further, still another exemplary embodiment is provided in which three steel sheets W1 to W3 are welded to each other by a laser beam as shown in FIG. 6. In this case, the movable electrode 2 is contact with the uppermost steel sheet W1 and further the stationary electrode 3 is made to come into pressure-contact with the uppermost steel sheet W1, and the contact position P2 and the pressure-contact position P3 with the steel sheet W1 are heated and the thus generated heat is transferred from the steel sheet W1 to the steel sheet W2. At this time, the steel sheet W1 is greatly warped upward by the heat generated at the contact position P2 and the pressure-contact position P3. On the other hand, since only a portion of the heat generated at the contact position P2 and the pressure-contact position P3 on the steel sheet W1 is transferred to the steel sheet W2, the steel sheet W2 is warped upward a little. Therefore, the gap H is formed between the steel sheets W1 and W2 and also between the steel sheets W2 and W3. Accordingly, a laser beam is irradiated at a position where the gap H is a predetermined interval. At this time, the steel sheets W1 to W3 are heated at the irradiating position P4 of the laser beam L and the metallic component (zinc) of the coating is vaporized. However, the thus vaporized zinc vapor is discharged from the gap H into the atmospheric air. Due to the foregoing, the steel sheets W1 to W3 can be positively and strongly welded. When an intensity of the electric current is adjusted to a value so that a heat input at the contact positions P2 and P3 can become a value which is sufficiently high for forming the gap while not exceeding a value at which the surface of the steel sheet W1 is melted, the surface of the steel sheet W1 is not substantially damaged.

In this connection, in the present exemplary embodiment, the movable electrode 2 is arranged in such a manner that it can be freely rotated by the rotary mechanism 7. However, as long as a mechanism is composed in such a manner that a forward end position of the movable electrode 2 can be changed with respect to the laser head 10 and moved when it follows the surface shape of the steel sheet W1, any mechanism can be adopted. Therefore, a rail may be provided on the arm 6 and the movable electrode 2 may be moved when it slides on the rail. Instead of the rotary mechanism 7, a rubber bush or a spring may be used.

In the present exemplary embodiment, the laser beam L is irradiated onto the uppermost steel plate W1. However, the same effect as that of the present exemplary embodiment can be provided even in the case of fillet weld in which the laser beam L is irradiated in the direction of end portions of the steel sheets W1 and W2 toward the gap H formed between the steel sheets W1 and W2.

In the present exemplary embodiment, the steel sheets W1 to W3 are galvanized steel sheets. However, the steel sheets W1 to W3 may be sheets, the mother metal of which is another iron alloy or aluminum alloy. The surface coating of the steel sheets W1 to W3 may be not only galvanization but also nickel or chrome plating, the boiling point of which is lower than that of the steel sheet material.

While the invention has been described with reference to the exemplary embodiments and variations thereof, the technical scope of the invention is not restricted to the description of the exemplary embodiments and variations thereof. It is apparent to the skilled in the art that various changes or improvements can be made. It is apparent from the description of claims that the changed or improved configurations can also be included in the technical scope of the invention.

What is claimed is:

1. A laser welding method of welding a plurality of flat works, at least one of the works having a coating on a surface, the laser welding method comprising the steps of:

energizing an uppermost work by an electrode that is in contact with the uppermost work so as to form a gap between the works by forming a deformed portion on the uppermost work and by separating the deformed portion from an adjoining work; and irradiating a laser beam at a position where the gap is formed.

2. The laser welding method according to claim 1, wherein the electrode comprises a pair of electrodes, one of the electrodes comes into contact with the uppermost work, the other electrode comes into pressure-contact with the uppermost work, and electricity is applied between the pair of electrodes.

3. A laser welding method of welding a plurality of flat works, at least one of the works having a coating on a surface, the laser welding method comprising the steps of:

energizing an uppermost work by an electrode that is in contact with the uppermost work;

forming a gap between the works by forming a deformed portion on the uppermost work and by separating the deformed portion from an adjoining work, the deformed portion being formed by thermally expanding an electrode contact portion of the work or the electrode contact portion and a heat transfer portion of an adjoining work to which heat is transferred from the electrode contact portion, and by contacting the electrode contact portion or the electrode contact portion and the heat transfer; and irradiating a laser beam at a position where the gap is formed.

4. A laser welding device for welding a plurality of flat works, at least one of the works having a coating on a surface, the laser welding device comprising:

a pair of electrodes adapted to engage and energize an uppermost work, heating and deforming the uppermost work such that the uppermost work and an adjoining work are moved away from each other to form a gap between the uppermost and adjoining works; and a laser head for irradiating a laser beam at a portion of the uppermost work where the gap is formed.

5. The laser welding device according to claim 4, wherein the electrodes are adapted to energize the uppermost work so as to thermally expand an electrode contact portion of the uppermost work or the electrode contact portion of the uppermost work and a heat transfer portion of the adjoining work to which heat is transferred from the electrode contact portion, form a deformed portion on the electrode contact portion or the electrode contact portion and the heat transfer portion, and form a gap.

6. The laser welding device according to claim 4, wherein the laser head is disposed to irradiate the laser beam on a portion of the uppermost work where the gap is large enough to spread a vapor generated by vaporization of the heated coating.

7. A laser welding device for welding a plurality of flat works, at least one of the works having a coating on a surface, the laser welding device comprising:

a pair of electrodes for energizing an uppermost work, so as to form a gap between the works; and a laser head for irradiating a laser beam at a portion of the uppermost work where the gap is formed, wherein the pair of electrodes comprises a stationary electrode capable of coming into pressure-contact with the uppermost work and a movable electrode capable of freely coming into contact with the uppermost work.

8. The laser welding device according to claim 7, wherein the stationary electrode is arranged at a position spaced from the laser head by a predetermined distance, and the movable electrode is arranged at a position spaced from the laser head by a predetermined distance.

* * * * *

UNITED STATES PATENT AND TRADEMARK OFFICE
CERTIFICATE OF CORRECTION

PATENT NO. : 7,319,205 B2 Page 1 of 1
APPLICATION NO. : 11/461029
DATED : January 15, 2008
INVENTOR(S) : Oda It is certified that error appears in the above-identified patent and that said Letters Patent is hereby corrected as shown below:

Column 9, Line 39, (Claim 3, Line 15), after "transfer" insert --portion--.

Signed and Sealed this

Twentieth Day of May, 2008

JON W. DUDAS
*Director of the United States Patent and Trademark Office*